Sept. 22, 1959 R. M. GERLITZ 2,905,892
TESTING METHOD AND APPARATUS
Filed Dec. 20, 1957 4 Sheets-Sheet 1

INVENTOR.
RICHARD. M. GERLITZ
BY
F D Prager
ATTORNEY

INVENTOR.
RICHARD M. GERLITZ
BY
F D Pryor
ATTORNEY

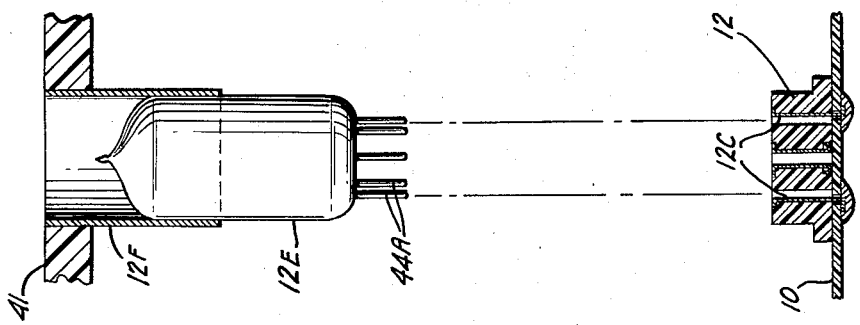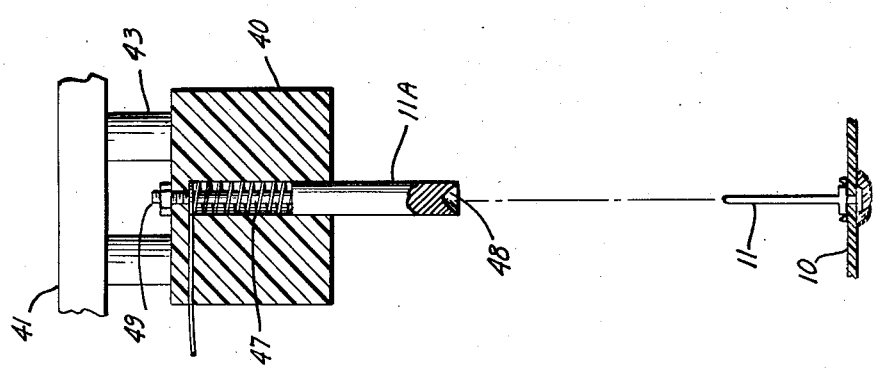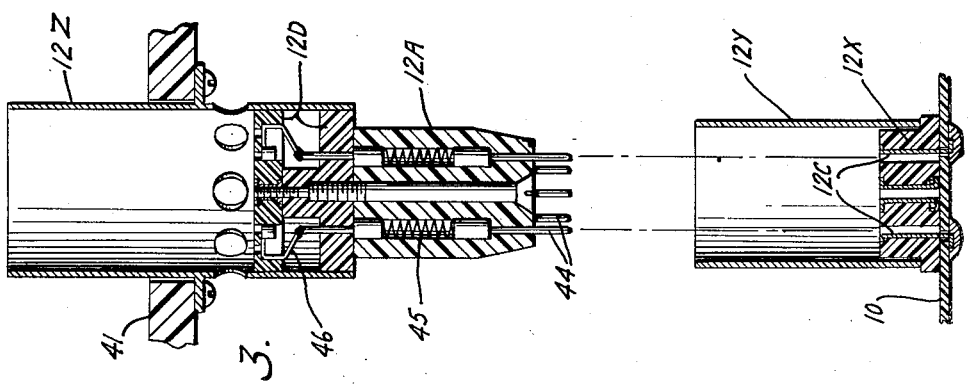

Sept. 22, 1959 R. M. GERLITZ 2,905,892
TESTING METHOD AND APPARATUS
Filed Dec. 20, 1957 4 Sheets-Sheet 4

FIG. 6.

INVENTOR.
RICHARD M. GERLITZ
BY
F D Prager
ATTORNEY

United States Patent Office 2,905,892
Patented Sept. 22, 1959

2,905,892

TESTING METHOD AND APPARATUS

Richard M. Gerlitz, Blue Bell, Pa., assignor to Philco Corporation, Philadelphia, Pa., a corporation of Pennsylvania Application December 20, 1957, Serial No. 704,027

10 Claims. (Cl. 324—73)

This invention relates to the testing of circuit subassemblies such as the so-called printed circuit panels which are used in television receivers and the like.

While several types of testing techniques are now available, which allow the testing of panels and/or components thereof as to a variety of characteristics and functions, it was thus far either impossible or unduly expensive to carry out a complete and satisfactory testing program as rapidly as is required in modern electronic fabrication, where millions of each type of circuit panels and the like are usually involved. This applied particularly where thermionic tubes were involved. It is therefore a primary object hereof to provide simple and inexpensive testing procedures and means, capable of complete and satisfactory performance at an extremely rapid rate. Other objects will appear from the description of preferred embodiments, which follows.

In a typical structure embodying the invention the upper or component side of a circuit panel to be tested, and which may comprise tube sockets and a variety of other components and connectors, is mechanically plugged into the underside of a testing stand or jig which comprises the tubes and similar non-permanent panel components. Provision is made to avoid delays in, as well as incompleteness of, all tube testing and related functions; and for this purpose special arrangements of circuitry and associated parts may be used, as will appear in greater detail hereinafter.

Figure 3 is a cross sectional view of a detail, taken along line 3—3 in Figure 2;

Figure 4 is a view similar to Figure 3 but taken along line 4—4;

Figure 5 is another view similar to Figure 3 but showing a modification thereof; and Figure 6 is a diagram of electrical and other connections used in the machine according to Figure 1.

Figure 1:
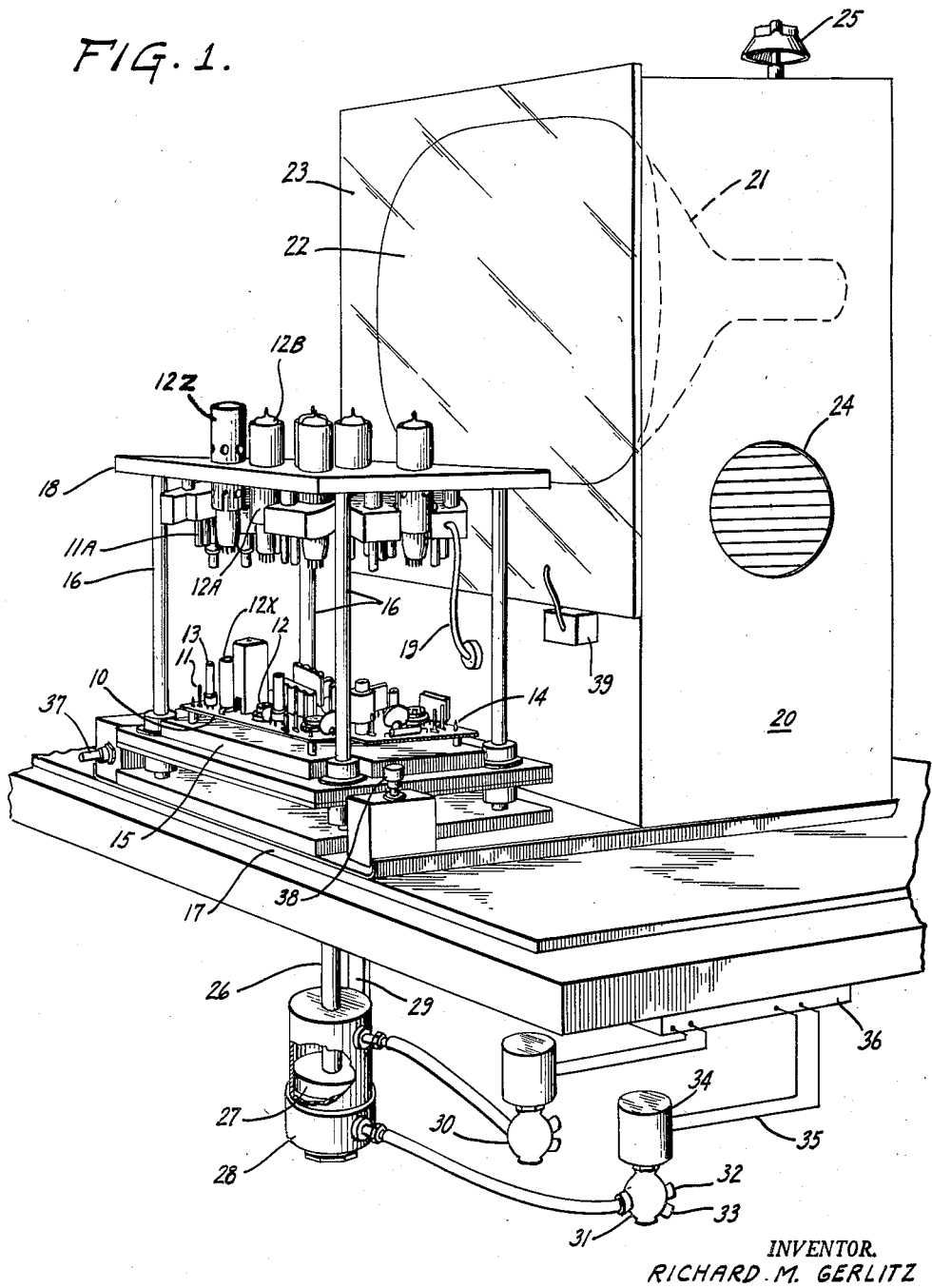
Figure 1 is a perspective view of apparatus embodying the present invention.

Referring initially to Figure 1: the panel 10 to be tested, with wire wrapping lugs 11 and other components 12, 13, etc. inserted thereon, is mounted on pins 14 upstanding from a supporting plate 15. This plate is slidable on vertical track members 16, which are mounted on a stationary base 17 and which may be additionally used as supporting posts. A testing stand or jig or subassembly 18 is held in stationary position above the base 17 and panel 10, for instance by the upper ends of posts 16.

The subassembly 18 comprises a series of connector units 11A, 12A, etc. One connector corresponds with every component terminal which normally requires electrical connections, other than those already incorporated in the panel itself; for instance, one connector corresponds with every wire wrapping lug 11, and one with substantially every terminal in a tube socket 12. Each unit 12A of tube socket connectors has that kind of tube inserted therein, at 12B, which is to be used on the panel 10 when that panel is in actual use, as distinguished from the testing operation performed in accordance herewith.

Electrical connections to a power supply, to ground and to interconnected panels are made from the stand 18, through a cable 19, to a chassis unit 20 supported on the base 17. This chassis unit contains a receiver tube 21, of the type to be employed in actual use, the screen 22 of which is visible behind a transparent front wall 23. The cabinet may also contain a conventional loud-speaker 24 and the usual tuning, switching and control means 25.

The panel-supporting plate 15 is rigidly secured to the upper end of a rod 26, connected with a piston 27 in a cylinder schematically shown at 28, said cylinder being mounted on the underside of the base 17 by structural means 29 and having three-way valves 30, 31 connected respectively to the top and bottom thereof, each of said valves having a pressure supply duct 32 and a vent or waste duct 33. Solenoids 34 control the valves 30 and 31 to raise or lower the piston 27, thereby raising or lowering the panel 10. For this purpose electrical connections 35 lead to the solenoids from a relay unit 36, which may form a part of cabinet 20 extending below base 17. Push buttons 37, 38 may be used to control relay unit 36, desirably so that the operator must operate both push buttons to raise panel 10—thereby protecting the operator against accidental injury—while successive operation of one push button 38 may lower the piston and panel. In addition, a switch 39 may be provided as a limit switch and circuit holding means, as will be described hereinafter.

Figure 2:
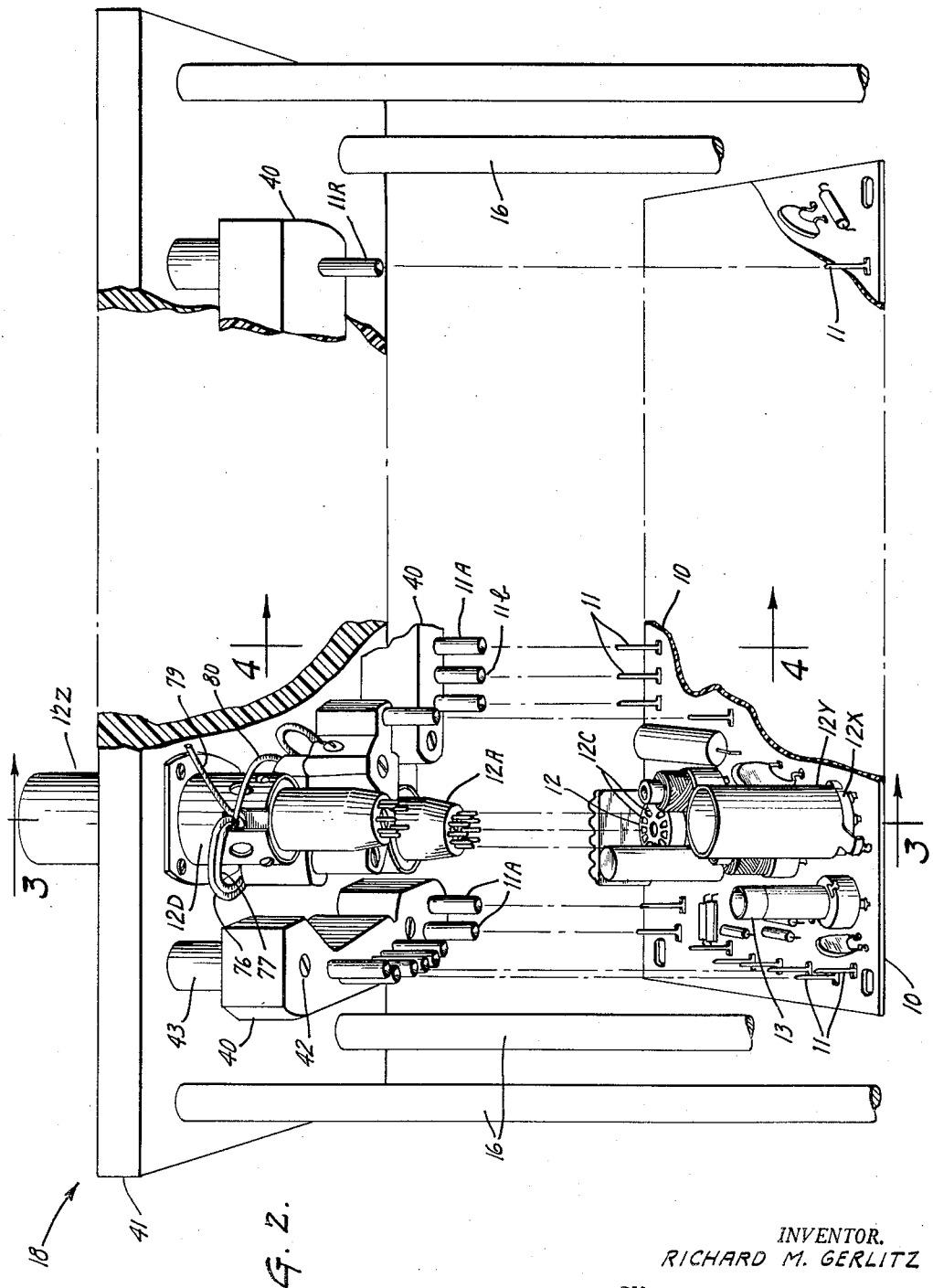
Figure 2 is an enlarged perspective front view of a portion of said apparatus.

As shown in Figure 2, the lug connectors 11A are desirably held in block members 40, wherefrom they project downwardly. Each block 40 may be a plastic member having sliding fit with a metallic connector rod 11A; and each block may be rigidly secured to the underside of a support plate 41, forming part of jig 18. For such securement screw members 42 may extend into the underside of the block and through spacers 43 into plate 41. Each connector rod 11A has proper vertical alignment with a lug 11 and proper lateral alignment with other rods and contactors 11B, 12A, etc., for the other members to be made part of the test circuit. The tube socket contactors 12A, etc., and lug contactors 11A, etc., may be installed on different levels, depending on the exact types of lugs 11, sockets 12 and other components to be tested. All connectors 11A, 12A, etc., as shown, are arranged in vertically depending relation to the jig support plate 41. By this expedient contact can be made to the panels to be tested, in substantially the same way as contact is made by various terminals, incident to the insertion of the tubes and the installation of the connecting wires, as used in an actual and complete receiver set or equivalent instrument.

Some of the tube sockets 12X on panel 10 are provided with shields 12Y; and in order to insure correct tube operation on jig 18, the corresponding tube connectors are provided with similar shields 12Z. Different lengths of connector bodies 12A are exposed on the underside of plate 41, depending on the presence or absence or specific form of members such as the shields 12Y.

The upper portion of a connector body 12A may comprise a standard tube socket 12D. This and other details of a tube socket connector are shown in Figure 3. It will be seen that the connector body 12A has a series of terminal engaging pins 44 vertically slidable therein and downwardly extending therefrom, each having a spring 45 biasing it downwardly. The spring is used also to connect the pin 44 with one of the terminal members 46 in the socket 12D forming part of connector 12A.

Similarly the slidable lug connectors 11A, Figure 4, may be biased downwardly by springs 47. Each lug connector may have a concave recess 48 at the bottom end thereof, in order to facilitate the centering and establishment of proper contact with the top of lug 11 to be contacted. The top end of the lug connector 11A may have a guide and stop member 49 secured thereto and slidably extending through the upper surface of the plug 40.

While Figure 3 shows the tube connector 12A without a tube actually inserted in the socket unit 12D thereof, it will be understood that in the actual operation of the testing device all required tubes, 12B, etc., are installed on the jig 18 as shown in Figure 1. It is also possible and sometimes desirable to secure such tubes to the jig support plate 41 in modified ways, for instance as shown in Figure 5. Here a tube 12E is press-fitted into the inside of a sleeve 12F the outside of which is press-fitted into a suitable aperture of the jig plate 41 so that the lead terminals 44A of the tube itself can be contacted with the socket terminals 12C on the panel 10. If the socket 12 requires no tube shield, as shown in Figure 5, the holding sleeve 12F may be made of non-conductive material. In certain instances the construction of Figure 5 is preferred over that of Figure 3 not only because of its greater simplicity but also because of the absence of special capacitive and/or inductive elements, such as members 44, 45. Various further modifications can of course be applied to such elements, as will readily be seen by persons skilled in this art.

Referring now to the electrical circuits of the testing device, illustrated in Figure 6: a power supply unit 50 is connected by conductor 51 and branch wire 52 with one of the lug connectors 11A on the jig 18, this connector being vertically aligned with the power supply lug 11 of the panel 10 to be tested. On the underside of this panel a copper strip, diagrammatically shown at 53, connects the lug 11 with a branch 54 leading to the load system 55 for the tube to be plugged into the socket 12. A tube 12B, of the type required at this point, is plugged into terminals 56 of a corresponding socket 12D on the jig 18. The connection of load system 55 to tube 12B comprises a copper strip conductor 57 with a branch 58 leading to the plate terminal 59 of tube 12B, through socket 12, 12D. Similarly the ground connection 60 of the load system 55 is connected with the cathode of tube 12B by conductor 61. The grid of tube 12B may be connected for instance by conductors 62, 63 with a lug 11M on panel 10 which by a lug connector 11B on jig 18 may be connected, for instance, to one of the terminals of television chassis 20.

The power supply lug 11 is shown as additionally connected with load system 64 of a second tube socket 65 by conductor 66. The cathode of the second tube 67 for socket 65 is connected by a wire 68 to the ground connection 69 of load system 64. Other tubes and components on panel 10 may be interconnected in similar ways; and terminals of components not shown and installed on panel 10 may for instance be connected with lugs 11N, 11O, etc. by conductors 70, 71, etc. In addition, the ground connection 60 may be connected by a copper strip 72 to a lug 11P. Actual ground connection and actual connections to other parts of the television circuit are made through lug connectors 11B, 11C, 11D and 11E on the test jig 18, which are vertically lined up respectively with the panel lugs 11M, 11N, 11O and 11P, and which are connected with various terminals on the tube 22 or chassis 20 or the circuits thereof.

It will be seen that, when the piston 27 has raised the panel 10 so that the conductive panel lugs etc. are conductively coupled to their respective contactors on the test jig, the panel 10 and the jig 18 jointly form, in substance, the equivalent of the panel, and of the connections thereof, which have been omitted from the chassis 20. A complete receiver circuit is thus provided by the raising of the piston 27. It is however preferred to make somewhat special provision for some of the circuit elements or sub-combinations, as will now be explained.

In the first place it is preferred to connect the filament heaters of all tubes 12B, 67, etc. independently through a filament power supply system 73 which in its entirety is disposed on the jig 18 and which includes no circuitry forming part of panel 10. By this expedient the necessity of heating up the cathodes is avoided, whenever contact between panel 10 and jig 18 is broken and then reestablished. This in turn greatly accelerates the testing procedure.

Because of the use of this independent filament supply system 73, the filament connector lugs 11Q, 11R of the panel 10 and the printed strips or circuit elements 74, 75, connected therewith remain unused and unconnected in the system as so far described. It is however preferred to test the panel circuitry in its entirety, including the strips 74, 75 and lugs 11Q, 11R. This becomes possible by making special connection to at least one set of panel socket terminals, connected with the printed filament conductors 74, 75. For this purpose two conductors 76, 77 are so installed on test jig 18 as to contact filament terminals in a panel socket 12, while not contacting filament terminals in any socket 12D forming part of jig 18. These special conductors 76, 77 may also be noted in Figure 2.

As shown in Figure 6 these special conductors are connected with a neon bulb 78, which serves to indicate the presence of satisfactory filament wiring on panel 10. It will be understood that substantially no time delay is involved in the lighting up of a suitable neon bulb 78, upon the establishment of contact at the exposed ends of 76, 77, whereas the heating up of the cathode filaments would involve some appreciable delay. As further shown in Figures 2 and 6 additional wires 79, 80 may connect the system 74 to 77 with other circuitry, such as that provided by tube socket contactors 81, which need not be discussed in detail. As further shown in Figure 6, the testing of the circuits 74 to 80 may be achieved for instance by connecting a resistor 82 to the power supply line 51, ahead of one of the lug contactors 11G for testing of filament circuitry, so that a suitable current may flow through resistor 82, lug contactor 11G, lug 11R, copper strip 75, wire 77, neon bulb 78, wire 76, copper strip 74, lug 11Q and lug contactor 11F coupled to the ground connector 11E.

In the actual use of the present method or system it is generally necessary to test large numbers of identical panels 10 by means of a jig 18 having contactors 11A, 12A, etc. at locations fitting the terminal units 11, 12, etc. of the panels. Circuitry other than that of the panels to be tested is usually installed in the chassis 20. The testing of a panel starts by manually or automatically placing the panel on the indexing pins 14 of the lower support plate 15, Figure 1. The operator then presses the two push buttons 37, 38, Figures 1 and 6, thereby causing suitable energization of the valve solenoids 34 which in turn causes rapid rising of piston 27, plate 15 and panel 10 and contacting of the various panel terminals 11, 12, etc. with the corresponding contactors 11A, 12A, etc. on the jig.

The establishment of this contact may substantially coincide with the closing of the switch 39 which establishes connection from the power supply unit 50 to the wire 51 through a normally open switch element 39A. This switch may also close a self-holding circuit for relay 36, through a normally open switch element 39B, so that the electrical energization of solenoids 34, initiated by the operation of the push buttons, continues upon the release of said buttons.

In the process of contacting the lugs 11 with the contactors 11A, the tip of each lug 11, Figure 4 is automatically centered by sliding enegagement with the concave surface 48, so that it is unimportant whether such a lug may be slightly bent or uncentered, as is often unavoidable as a result of the insertion processes used and/or the further handling of the panels. Provision for similar self-centering may of course be provided in the socket-contacting devices, as is well-known in the art. It will also be seen that slight differences of elevation between different lugs 11, etc. are not deleterious, the contacting being resilient and/or slidingly yielding by virtue of the use of springs 45, 47 or the like.

When the panel 10 has been contacted with the stand 18, the unit 20, 22, 24 exhibits proper sound and picture. This of course assumes that the unit has previously been tuned to a suitable transmission channel and that the transmitter is operating. The coming on of suitable sound and of a well defined picture repeats itself upon the testing of each new panel which is free from defect, whereas any kind of defect of a panel on the test stand is reflected by faulty picture or sound, or by complete failure of picture or sound. Desirably, the determination is instantaneous, and to this end the various tubes have their cathodes heated throughout the testing procedure by the filament supply system 73, and the required power is supplied throughout the active testing of the panel 10, through the closed switch 39A. The testing is also complete, as to all printed circuits and similar copper strips and the like, as well as with respect to the various components on the panel, all component terminals other than the filament terminals being connected in the precise way in which they are used in normal operation and the filament terminals being separately connected to the neon bulb indicator 78 which can be observed instantly, together with the picture on the screen 23.

The testing operation performed with the present machine may in some instances be preceded or followed by further tests, for instance those conducted in accordance with the invention described and claimed in the application of Walter W. Ludman et al., Serial No. 591,740, filed June 15, 1956, entitled "Testing Apparatus" and assigned to the assignee of the present invention. The Ludman et al. test procedure differs from the present one in that it is more detailed but less complete in an overall or functional sense. The Ludman et al. test procedure establishes the presence or absence of specified defects and also the exact location of each defect, if any, but it will not show whether the panel tested is completely satisfactory in the sense of its ultimate, comprehensive function. Thus it has been found, upon a complete check of circuit panels passed by the Ludman et al. procedure, that between two and three percent of such panels are still rejected upon further testing according to the present invention. Many thousands of panels and millions of components are represented by these two or three percent of the grand total. The manufacturer's success in fabricating receivers and the like can therefore be enhanced greatly by the use of the present testing procedure.

While the testing according to this invention may precede or follow or replace the testing according to the Ludman et al. invention, it may in some cases be preferred to expose the panels rejected by the present machine, and only those, to the detailed test according to Ludman et al. Considerable testing time is saved in that event. In addition it then becomes unnecessary, as to the majority of the panels, to apply testing tools to the solder spots on the underside of the panel, as contemplated in the Ludman et al. procedure. This last-mentioned feature is important in those instances where disturbance of protective layers on so-called printed circuitry must be avoided with maximum care.

On the other hand, a more complete testing program may call for both the comprehensive functional testing of panels according to the present invention and the individual, so-called static testing of panel-mounted components according to Ludman et al. The static test can be conducted so as to show not only defects and the location thereof, but specific, quantitive data, for instance as to impedance, inductance, capacitance, transformer ratio, rectifier performance and many other characteristics, as applicable to the various components. Thus it may be preferred, in the interest of full quality control, to apply the static test to each panel directly after insertion of components, and then as a final measure before installation of the panel to apply the functional test to each panel which has passed the static test.

While only a single embodiment of the invention and a few ways of using it have been described, it should be understood that the details thereof are not to be construed as limitative of the invention except insofar as it is consistent with the scope of the following claims.

I claim:

1. Apparatus for testing television circuit panels having terminals for thermionic tubes thereon, said apparatus comprising: a panel holder for holding such panels; a tube holder, holding such tubes and their terminals, each of said terminals being indexed to engage, and each except the filament terminals being arranged to contact the corresponding terminals on the panels; means for completing a circuit including said filament terminals to permanently energize the filaments of the tubes; a manipulator for moving the holders, one relative to the other, to temporarily engage the terminals on one of the holders with those on the other; and a television device, devoid of a panel of the type to be tested but interconnected with the terminals on the tube holder and thereby adapted to be provided with such a panel.

2. Apparatus as described in claim 1, and additionally comprising a power supply unit for said television device; and means, controlled by the manipulator, for connecting said power supply unit to said television device when, and only when, the terminals on the tube holder are engaged with those on the panel.

3. Apparatus as described in claim 1, wherein the manipulator comprises: a fluid operated member; solenoid valve means for controlling movement of said member; manual switch means for making and breaking circuits for the solenoids of said valve means; and automatic switch means, controlled by the manipulator, for holding such circuits.

4. Apparatus as described in claim 1, wherein said terminals on the tube holder comprise lead members rigid with the tubes, socket means engaging the lead members and metallic terminals extending from the sockets toward the panels to be tested.

5. Apparatus as described in claim 4, for the testing of panels having terminals for shielded thermionic tubes, said apparatus comprising shield means surrounding the corresponding sockets and tubes on the tube holder.

6. Apparatus as described in claim 1, wherein said terminals on the tube holder are integral with said tubes thereon.

7. In apparatus for testing electronic circuit panels with socket type means permanently installed thereon for non-permanent installation of circuit components including heater means: a first support, adapted to have such a panel held and registered thereon; a second support, having such components thereon, contactor means of said components being indexed with the socket type means of the so-registered panel, except for the contactors of said heater means; means for energizing such heater means independently of the panel; and means for moving the supports relative to one another to make and break contact between the socket type means and the contactor means.

8. Apparatus as described in claim 7 additionally comprising circuit means on the second support, indexed with the contactors of said heater means and adapted to energize said heater means upon the making of said contact.

9. In apparatus for testing electronic circuit panels with components such as wire wrap lugs and tube sockets permanently installed thereon and provided for non-permanent installation of replaceable elements such as tubes and the like: a panel support, adapted to have such a panel held and registered thereon; a test stand, supporting said replaceable elements and a complete set of terminals of said replaceable elements, the several terminals on the test stand being insulated from one another and indexed with corresponding components on the panel; and means for moving the panel support relative to the test stand to simultaneously make contacts between terminals on the test stand and corresponding components on a panel and thereafter simultaneously to break such contacts; the test stand including thermionic tube means and terminals thereof, indexed with corresponding tube socket means on a panel, the test stand also including means for permanently energizing the heater filaments of such tube means.

10. Apparatus as described in claim 9, and wherein the test stand additionally includes means for feeding electrical energy to those tube support terminals which contact the wire wrapping lugs connected with the filament circuit conductors on the panels; and means connected with the filament terminals of at least one of the sockets, upon said making of contact, for indicating continuity of said filament circuits on the panels.

References Cited in the file of this patent

UNITED STATES PATENTS

| | | |
|---|---|---|
| 1,365,734 | Shackleton | Jan. 18, 1921 |
| 1,646,152 | Kleber | Oct. 18, 1927 |
| 1,875,624 | Lowry | Sept. 6, 1932 |
| 2,728,890 | Zimmerman | Dec. 27, 1955 |
| 2,795,664 | Conrad | June 11, 1957 |